July 11, 1961 F. E. PASCHKE 2,992,356
TRAVELING WAVE AMPLIFIER TUBE
Filed July 31, 1956 3 Sheets-Sheet 1

INVENTOR.
FRITZ E. PASCHKE
BY William A. Balesak
ATTORNEY

INVENTOR.
FRITZ E. PASCHKE
BY
William A. Zalesak
ATTORNEY

United States Patent Office 2,992,356
Patented July 11, 1961

2,992,356
TRAVELING WAVE AMPLIFIER TUBE
Fritz E. Paschke, New Brunswick, N.J., assignor to Radio Corporation of America, a corporation of Delaware
Filed July 31, 1956, Ser. No. 601,246
14 Claims. (Cl. 315—3.6)

This invention relates to improved traveling wave amplifier tubes. While described with reference to magnetron amplifier tubes, it will be appreciated that the invention may also be used to advantage in other types of traveling wave tubes.

A traveling wave magnetron amplifier tube has been suggested that comprises an elongated, angularly-periodic signal wave propagating structure adapted to propagate signal waves along axial and transverse paths with a predetermined axial phase velocity to establish harmonics of said waves each having a phase velocity along a spiral path at a given acute angle to the paths of the signal waves, and means for projecting a beam of spiralling electrons along the wave propagating structure in wave interaction relation therewith and in a radial direct-current electric field, with the electrons having an axial velocity component substantially less than the predetermined axial phase velocity of the structure. The electrons in the beam are projected in spiral paths along the structure at a velocity such that at substantially all points in its path each electron is subjected to a substantially constant-phase electric field produced by a given one of the space harmonics of the signal waves propagated along the structure.

In order to have interaction between an electron beam and a signal wave or space harmonic, the beam velocity must be in the same direction as, and suitably matched to, the phase velocity of the signal wave with which interaction is desired. The group or energy velocity of the signal wave or space harmonic may be either in the same or in the opposite direction from that of this desired phase velocity. When the group velocity of the wave is in the same direction as this phase velocity, the wave is referred to as a forward wave and we have forward wave interaction, and when the group velocity is in the opposite direction from this phase velocity, the wave is referred to as a backward wave and we have backward wave interaction.

In a traveling wave magnetron amplifier tube it is desirable to use a dispersive wave propagating structure, since such a structure is adapted to propagate signal waves with a lower group velocity than in a non-dispersive structure and thus lends itself to better coupling with the electron beam of the tube. However, as is known, dispersive wave propagating structures usually lead to narrow bandwidth operation. This is so because the phase velocity of such structures decreases with increasing signal wave frequencies for forward wave interaction and increases with increasing frequencies for backward wave interaction.

Accordingly, one object of the invention is the provision of an improved traveling wave amplifier tube having a dispersive wave propagating structure and wherein the tube is capable of uniformly amplifying relatively high frequency signal waves over a frequency range which is much greater than that in known tubes of this type.

A further object of the invention is to provide an improved wave propagation structure for such a tube.

The foregoing and related objects are achieved in an electron tube having an improved wave propagation structure which is bi-periodic, or periodic in two directions, and wherein the periodicity of the structure is such that a change in phase velocity-versus-frequency characteristic in one of the directions is compensated by an opposite change in phase velocity-versus-frequency characteristic in the other direction, to give resultant wide bandwidth.

In one embodiment of the invention, the tube makes use of cylindrical geometry for propagating waves both in a circumferential direction or path (like a magnetron) and in an axial direction or path (like a conventional traveling wave tube). This tube includes circumferential and axial wave propagating elements in the form of periodic delay lines. A beam of spiralling electrons interacts with the electric field of the signal in forward wave interaction on one line and in backward wave interaction on the other line to provide the desired uniform amplification over a wide band of frequencies. In this embodiment, a hollow beam of spiralling electrons is injected axially into an elongated annular space between two concentric cylindrical conductive structures in an axial magnetic field. One structure is a wave transmission line comprising an array of axially-spaced, annular, interdigitated conductors, inductively and capacitively coupled to each other. The electrons have a spiral path of such pitch that as each electron travels along its spiral path it is continuously subjected to an electric field component of substantially constant phase. Traveling signal waves propagated axially and circumferentially along the line produce space harmonic waves moving helically around the array of annular conductors at various acute angles to the two wave paths, with the spiralling electrons in the beam interacting with a constant phase of the electric field of a given one of the space harmonics to produce amplification of the signal. This amplification is produced by the following phenomena. First, the electric fields of the space harmonic on the transmission line produce electron bunching in the direction of electron travel. In the presence of a radio frequency signal, the electron bunches are accelerated radially toward the transmission line by the radial direct-current electric field, which thereby delivers energy to the electrons. In turn, the electrons deliver energy to the transmission line by inducing radio frequency currents in the conductors making up the line, which energy appears as amplified radio frequency energy of the output signal wave. This latter phenomenon is discussed by R. R. Warnecke et al. in the article "The Magnetron Type Traveling Wave Amplifier Tube," Proceedings of IRE, volume 38, 1950, pages 486–495.

In the drawing, wherein like numerals refer to like parts:

Figures 1, 2:
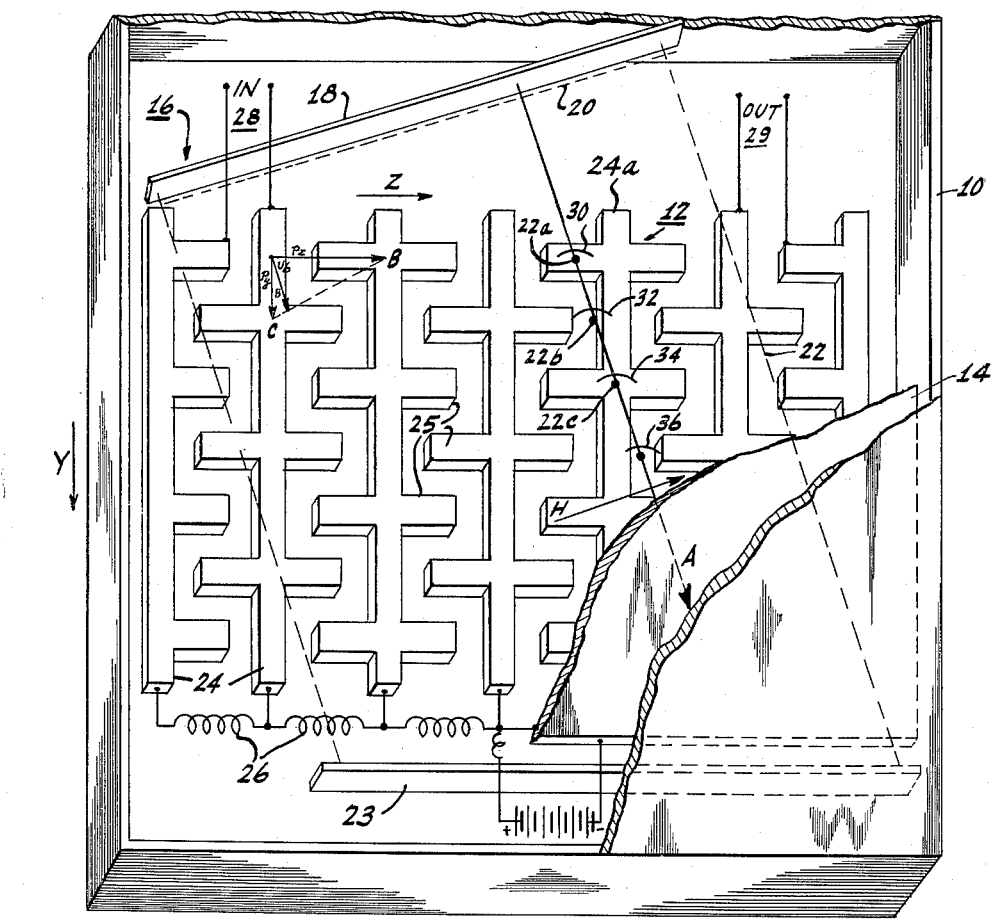
FIGURE 1 is a partially-schematic perspective representation of a portion of a tube according to one embodiment of the invention.
FIGURE 2 is a diagram illustrating an aspect of the operation of a traveling wave magnetron tube of the invention.

In FIGURE 1 there is illustrated a portion of one form of a traveling wave magnetron amplifier tube according to the invention. The tube is comprised of an envelope 10, a generally flat wave propagation structure or transmission line 12, a flat elongated conductor 14 in spaced parallel relation to the line 12, and electron gun means 16 including an elongated cathode 18 and an accelerating electrode 20 for projecting a sheet-like beam of electrons 22 adjacent to the line 12, in the space between the line and the conductor 14, and toward a collecting electrode 23 positioned on the side of the line 12 remote from the cathode. The transmission line 12 is comprised of an array of a plurality of elongated digitate members 24 having digits 25 with adjacent members interdigitated with each other. Adjacent members are capacitively and inductively coupled to each other. The capacitive coupling is realized by the capacitance between adjacent members 24 and the inductive coupling is realized by the provision of inductive connections 26 which, at microwave frequencies, are in the form of shunting bars. It is known that an interdigital line, such as that formed by two adjacent digitate members 24 in FIGURE 1 interdigitated with each other, will propagate backward waves longitudinally therealong (direction Y), and also that a series of capacitively-coupled parallel conductors, such as the members 24, will propagate forward waves transversely thereacross. As will be explained, a direct current electric field, between the elongated conductor 14 and each of the members 24, and a time-constant magnetic field having flux components in direction H (at a right angle to the direction A of electron flow and in the plane of the drawing), are used to achieve amplification of a signal. The transmission line 12 is coupled at opposite ends to a signal input 28 and a signal output 29, and is adapted to propagate waves longitudinally (arrow Z) as well as transversely (arrow Y) therealong. Since the lower side of the line 12 in FIGURE 1 of the drawing is adapted to reflect transversely traveling waves, a standing wave will be present in the transverse direction. The direction of electron flow is such that substantially every electron in the beam 22 has a longitudinal and transverse component of motion, as indicated by the direction of line A, the line representing the path of travel of one electron.

The radio frequency fields of the signal waves along the transmission line 12 give rise to an infinite number of sets of space harmonic waves, or space harmonics, along paths at various acute angles to the two directions of wave propagation along the transmission line, the space harmonics of each set having different phase velocities along a given path on the transmission line. Each space harmonic wave can interact with the beam, the most effective interaction taking place with the fastest wave of the set, the so-called fundamental wave. The path of travel of the electrons is made the same as the path of the space harmonic wave selected. For mechanical considerations it may be desirable to use space harmonic waves other than the fundamental at relatively high frequencies.

The interaction between the electrons in the beam 22 and the fundamental space harmonic wave is illustrated in FIGURE 1. At successive instants of time, during the operation of a tube of the invention, the wave form of portions of a signal would appear as illustrated by the space harmonic wave peaks 30, 32, 34 and 36 shown in solid curves. The electrons have a path which is inclined at an acute angle to the line 12 in a direction such that as each electron travels from a given position, such as that of the peak 30, adjacent to one member 24 to a corresponding but longitudinally and transversely spaced position the electron is subjected to an electric field component of the same phase as at the first position, as indicated by the peak 32. Assume that at a given instant of time a given electron is at a position 22a adjacent to member 24a of the line 12, and is subjected to a maximum electric field produced by a given wave 30. At a succeeding instant of time, when the same electron has moved along its path to a position at 22b the first wave peak 30 of the space harmonic also moves to the same new position so that the electron is still at the maximum field of the space harmonic wave peak 32. While given electrons will "see" the peak amplitude of the field of the space harmonic during their travel, other electrons in other portions of the beam will see other amplitudes of the field of the same space harmonic, and hence, some electrons will be continuously accelerated along their paths while others are continuously decelerated. This results in bunching of the electrons. The electron bunches, in turn, interact with the electric field of the space harmonic and give up energy thereto. This energy is derived as potential energy from the transverse direct current electric field which accelerates the electrons outwardly toward the transmission line. The electron bunches thus interact with the electric field of the space harmonic wave to increase the amplitude of the signal.

As is known, in dispersive wave propagating structures (such as the transmission line 12, which is dispersive in both the longitudinal and the transverse directions) the phase velocity of the structure decreases with increasing signal wave frequencies for forward waves, that is for waves having their phase velocities in the same directions as the group velocity of the signal wave; e.g. a wave having its phase velocity in a horizontal direction in the tube of FIGURE 1. Also, the phase velocity of the structure increases with increasing signal wave frequencies for backward waves, that is for waves having their phase velocities in directions opposite to the group velocity of the signal wave; e.g. a wave having its phase velocity in a vertical direction in the tube of FIGURE 1. That this is so may be seen from the following. In a traveling wave tube, the relation between the group velocity (that is, the energy velocity) $v_g$ of a signal wave and the phase velocity $p$ of the wave is given by the well-known formula $$v_g = \frac{p}{1 - \frac{\omega}{p} \cdot \frac{\Delta p}{\Delta \omega}} \quad (1)$$

where $\omega$ is $2\pi$ times the frequency of the wave, and $$\frac{\Delta p}{\Delta \omega}$$

is the rate of change of $p$ with $\omega$; $p$ is assumed to be always positive and in the direction of the beam for purposes of establishing a reference direction. For $$\frac{\Delta p}{\Delta \omega} < \frac{p}{\omega} > 0$$

$v_g$ and $p$ have the same sign, and hence $p$ is the phase velocity of a forward wave. However, for $$\frac{\Delta p}{\Delta \omega} > \frac{p}{\omega} > 0$$

$v_g$ and $p$ have opposite signs, hence, $p$ is the phase velocity of a backward wave.

In accordance with the invention, a wave propagation structure is provided which has two dispersive paths but which at the same time has wide bandwidth; the phase velocity of the structure for angular space harmonics remains substantially constant through changes in frequency of signal waves propagated along the structure. This is accomplished by providing a wave propagation structure which is adapted to simultaneously propagate signal waves in two different directions or paths (say, in longitudinal and transverse directions) as in the tube of FIGURE 1 and which is dispersive in both of the directions. As explained above, structure is adapted to propagate a forward wave in one direction or path and a backward wave in the other direction or path. With increasing signal wave frequencies the decrease in the phase velocity of the wave propagating structure in the one direction (for example, the longitudinal direction Z, the one propagating the forward wave in FIGURE 1) is compensated by an increase in the phase velocity of the wave propagating structure in the other direction (the transverse direction Y, the one propagating the backward wave in FIGURE 1). This condition of compensation, to be explained in connection with FIGURE 2 is achieved when $$\frac{v_y}{p_y} + \frac{v_z}{p_z} = 1 \qquad (2)$$

over the normal signal frequency flange of the tube, where $v_y$ is the velocity component of an electron in one direction (transverse direction Y), $p_y$ is the phase velocity of the backward wave along the wave propagating structure in the one direction, $v_z$ is the velocity component of the same electron in the other direction (longitudinal direction Z), and $p_z$ is the phase velocity of the forward wave along the wave propagating structure in the other direction.

The spiral angle of the electron beam along the wave propagating structure can be chosen so that the required electron velocity $v_b$ (which must be substantially the same as the phase velocity of the space harmonic with which the electron is in synchronism) is substantially constant over the normal frequency range of the device in which the wave propagating structure is to be used. This is illustrated in FIGURE 2. If $p_z$ represents the phase velocity of a forward wave in the Z direction and $p_y$ represents the phase velocity of a backward wave in the Y direction for a given frequency $f_1$ the phase velocities in the Z and Y directions are $p_{z_1}$ and $p_{y_1}$, respectively, as shown by the vectors from the origin O in FIG. 2. The straight line BC drawn between the outer ends of these vectors is the locus of points of constant phase of angular space harmonics at the frequency $f_1$. For another frequency $f_2$, higher than $f_1$, $p_z$ to $p_{z_2}$ while $p_y$ increases from $p_{y_1}$ to $p_{y_2}$, as shown by the vectors in FIG. 2. The straight line DE drawn between the outer ends of these vectors is the locus of points of constant phase of angular space harmonics at frequency $f_2$. The intersection F of lines BC and DE determines the line OF making a spiral angle $\theta$ with the Y direction. The space harmonic having the direction OF, or angle $\theta$, has the same phase velocity, equal to the length of the vector OF, for both frequencies, $f_1$ and $f_2$. Thus, if the electron beam is projected in the direction OF, at a fixed velocity $v_b$ equal to OF, the electrons will remain in synchronism with the space harmonic over a wide range of signal frequency.

Figure 3:
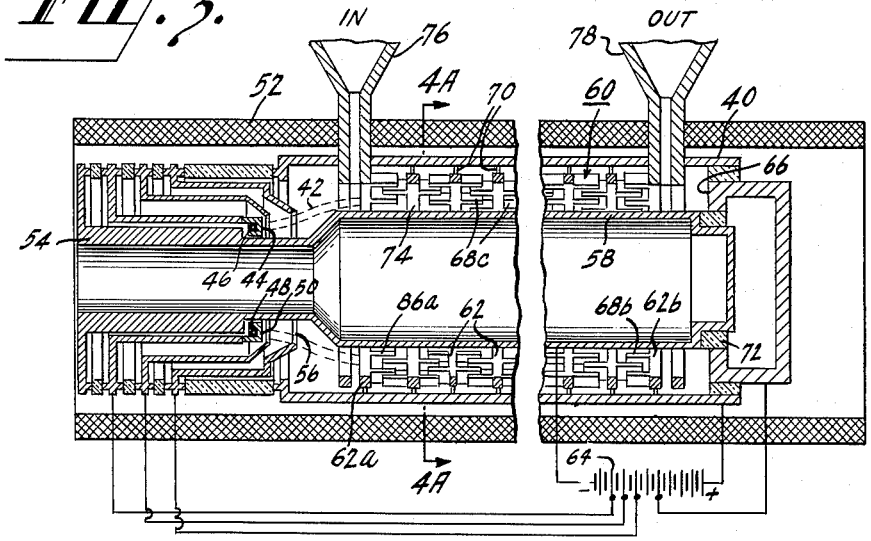
FIGURE 3 is a longitudinal sectional view of a tube illustrating another form of the invention.
Figure 4A:
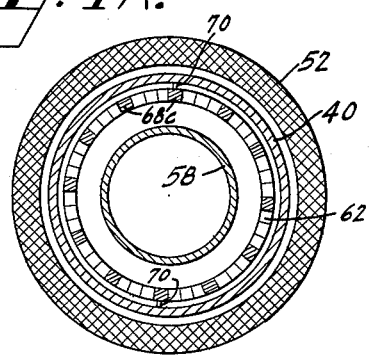
FIGURE 4A is a transverse sectional view taken through line 4A—4A of FIGURE 3.

Referring now to FIGS. 3 and 4A, there is shown another form of a magnetron amplifier tube embodying the invention. Within a tubular envelope 40, which is of a magnetically transparent material such as copper, are the various internal tube elements. A relatively dense hollow stream of electrons 42 is emitted from a thermionically electron emissive surface 44 of an annular cathode 46. The cathode 46 is provided with a heater 48. Electrons 42 from the cathode 46 are accelerated through an annular grid 50 due to a positive bias on it. A solenoid coil 52 around the envelope 40 produces a time-constant magnetic field parallel to the axis of the tube. After the electrons 42 pass through the grid 50 they are subjected to a radial direct current electric field between a cylindrical center conductor 54 positioned around the axis of the tube and a longitudinally extending hollow cylindrical electrode 56 spaced around and in coaxial relation with the center conductor 54. The center conductor 54 and the other electrodes of the tube are also made of a magnetically transparent material to maintain the axial magnetic field substantially free of distortion. The hollow electrode 56 is biased at a higher positive potential than the center conductor 54 so as to establish the radial electric field aforementioned which accelerates the electrons, after their passage through the grid 50, outwardly and across the axially-extending magnetic flux lines produced by the coil 52. As the electrons move outwardly by virtue of the radial electric field, the magnetic flux lines cause the electrons to acquire spiral motion. The electrons then enter an annular interaction space between a second cylindrical center conductor 58, which may be a continuation of the first center conductor 54, and a hollow wave propagation structure or transmission line 60 comprising an array of a plurality of axially-spaced, annular, digitate members 62 with adjacent members inter-digitated with each other. The array of digitate members 62 constitutes the anode of the tube. A direct current voltage source, indicated schematically by a battery 64, is connected between the center conductors 54 and 58 and the line 60 to establish the radial direct current electric field in the annular space therebetween. This radial electric field subjects spiraling electrons to a radially outward force which opposes the inward force exerted on the electrons by the axial magnetic field and maintains the electrons in the desired spiral paths as they interact with the signal waves propagated along the array of digitate members 62. The electrons drift axially of the tube, with the spiral motion described, toward a collecting-electrode 66 positioned at the end of the tube remote from the cathode 46. Actually, some of the electrons will be intercepted by the digitate anode members 62 as they move outwardly under the influence of the radial electric field. In order to aid in the assembly of the tube, the second center conductor 58 may be supported by the collecting electrode 66 at one end of the tube by means of a ceramic ring 72 sealed to the second center conductor 58. The ring 72 may be slidable with respect to the collecting electrode 66 to permit expansion and contraction of the parts encountered in the normal operation of the tube.

In the operation of the tube, electromagnetic signal waves entering the transmission line 60 through an input line 76 coupled thereto are propagated longitudinally and circumferentially along the line. As has been explained before in connection with FIG. 1, the electric fields of the waves give rise to an infinite number of sets of space harmonics, one of which is a space harmonic with which the spiraling electrons are in energy transfer relation. The electrons are subjected to a substantially constant phase electric field produced by that space harmonic, which results in bunching of the electrons. The electron bunches, in turn, interact with the electric field of the signal wave harmonic and give up energy thereto. This energy is derived as potential energy from the radial direct current electric field which accelerates the electrons outwardly toward the transmission line. The energy abstracted from the electron bunches appears as an amplification of the signal wave in an output line 78 coupled to the transmission line 60.

The transmission line 60 has a structure according to the following. The first and last of the annular digitate members 62a and 62b, respectively, have digits 68a and 68b, respectively, extending from only one side of the member while all of the other members have digits 68c extending laterally from both sides thereof. Each of the members 62 are supported by the envelope 40 by means of a pair of studs 70, one stub extending radially outward from each of two opposite portions of the circular perimeter of each annular digitate member. As will be explained in greater detail, the studs of the digitate members are arranged adjacent to each other in two longitudinally extending arrays, one of the stubs of each member being in each of the two arrays.

The members 62 are provided with digits 68 which are preferably at least as long as the distance between adjacent digits in the finished tube. The reason for this is that there is then provided a relatively large capacitance in the circumferential direction and a relatively low capacitance between adjacent members in the longitudinal direction. Consequently, the greatest portion of the electric energy is stored in the circumferential direction. As a consequence electrons, during interaction with the line 60, are subjected to a relatively small longitudinal electric field and the longitudinal component of velocity of the electrons in the beam is not appreciably reduced during the interaction. Also, as another desirable result of high circumferential energy storage, the collecting electrode 66 may be biased at a relatively low voltage and still efficiently collect electrons from the beam.

The stubs 70 aforementioned, together with the portion of the envelope 40 between adjacent stubs, constitute the inductive coupling between adjacent members 62. When the stubs 70 of adjacent conductors are positioned adjacent to each other, with the stubs arranged in two longitudinally extending lines as shown in FIGURE 3, the interdigital transmission line has a characteristic which favors the propagation of a forward wave in a longitudinal direction therealong, that is, $$\frac{\Delta p_x}{\Delta \omega} < \frac{p_x}{\omega} > 0$$

and favors the propagation of a backward wave in a transverse or circumferential direction therealong, that is, $$\frac{\Delta p_y}{\Delta \omega} > \frac{p_y}{\omega} > 0$$

For example, in one tube according to the invention, the array of digitate members may consist of a plurality of seven members: five members 62 each having digits 68c on opposite sides of a circumferentially extending, ring shaped portion 74 and two end members 62a and 62b, each having digits 68a and 68b, respectively, extending only longitudinally inward of the array. Each of the seven members may have an outer diameter of 3⅜ inches and an inner diameter of 3 inches (the members having a radial thickness of 3/16 inch and the ring-shaped portions 74 having a longitudinal extension of 3/16 inch) and be used together with an envelope 40 having an inner diameter of 4 inches, the radial length of the stubs 70 being 5/16 inch. Each digit 68 may have a longitudinal extension of 9/16 inch with its free end spaced ¼ inch from the ring shaped portion 74 of the adjacent member, the circumferential distance between adjacent digits of adjacent members being approximately 3/16 inch.

Figure 5A:
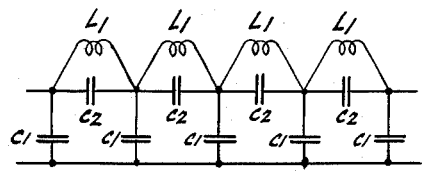
FIGURES 5A and 5B are schematic illustrations of the structures shown in FIGURES 4A and 4B, respectively.

FIG. 5A is a schematic illustration of the circuit formed by the digitate members 62 of FIG. 4A. The digitate members have capacitance $C_1$ between the center conductor 58 and the transmission line members and capacitance $C_2$ between adjacent members. Adjacent members also have inductances $L_1$ between them.

Figure 4B:
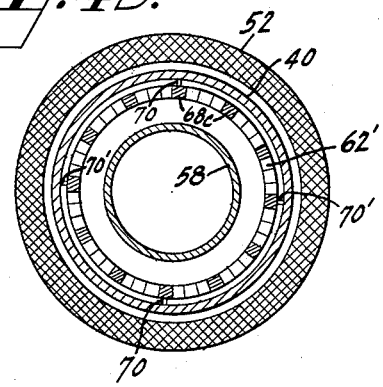
FIGURE 4B is a transverse sectional view, taken through a line corresponding to line 4A—4A of FIGURE 3, of a tube similar to the one of FIGURE 3 and illustrating a modification of the tube of FIGURE 3.
Figure 5B:
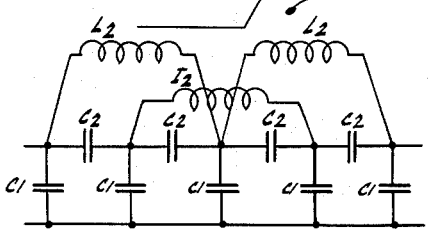

FIGURE 4B, a transverse sectional view taken through a line corresponding to line 4A—4A of FIG. 3 of a tube similar to the one of FIG. 3, shows a tube according to the invention which may be used as a backward wave tube, that is, as a backward wave amplifier or as a backward wave oscillator. One set of alternate digitate members of the tube shown in FIGURES 3 and 4A is rotated 90° with respect to the other set so as to present stubs 70' disposed 90° circumferentially with respect to the stubs 70 of adjacent members of the other set, so that the transmission line formed by the digitate members favors backward wave interaction in a longitudinal direction along the line. The tube similar to that of FIGURE 3 but operative as a backward wave tube would then have the members 62' arranged with alternate members oriented like the member 62' of FIGURE 4B and the intermediate members oriented like the member 62 of FIGURE 4A. A diagram of the circuit formed by this new arrangement is illustrated in FIGURE 5B. Adjacent members are still capacitively coupled to each other (capacitance $C_2$) and have capacitance $C_1$ between the members and the center conductor, but alternate members are now inductively coupled to each other as indicated schematically at $L_2$.

When the tube of FIGURE 4B is used as a backward wave amplifier, the input and output connections 76 and 78, respectively, in the tube of FIGURE 3, are reversed so that the signal to be amplified is coupled to the tube at 78 and the amplified wave is taken from the tube at 76. When used as a backward wave oscillator the output of the tube is also taken from the tube at 76, but the energy transfer coupling 78 adjacent to the collecting electrode is coupled to a matched load to prevent reflection of waves from the collecting electrode end of the tube. When the tube is used as a backward wave oscillator the beam current must be larger than the starting current, that is, the current required to initiate oscillations.

Figure 7:
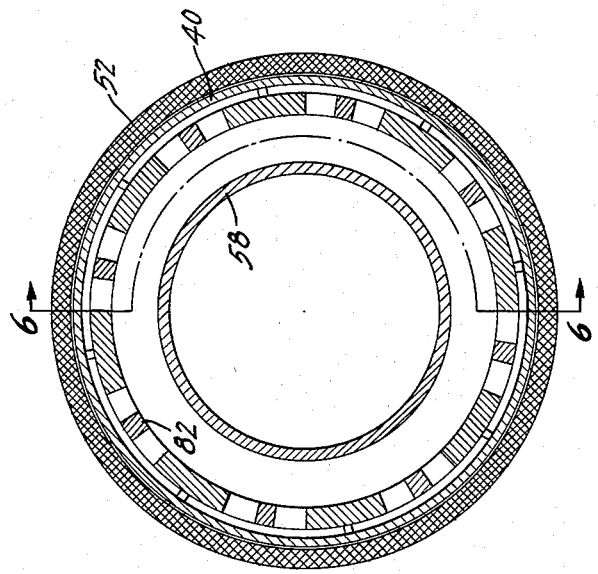
FIGURE 7 is a transverse sectional view taken along line 7—7 of FIGURE 6.
Figure 6:
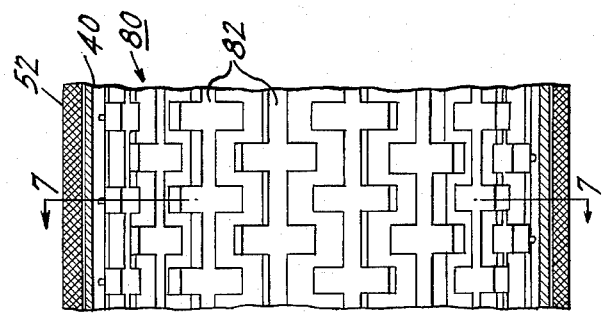
FIGURE 6 is a longitudinal sectional view of a portion of a tube embodying yet another form of the invention.

FIGURES 6 and 7 illustrate another form of a traveling wave magnetron amplifier tube according to the invention. The tube of FIGURES 6 and 7 is similar to the one of FIGURE 3, with the exception that the transmission line 80 is made up of a circumferentially spaced array of elongated, longitudinally extending, digitate members 82 inductively and capacitively coupled to each other. This structure favors backward wave interaction in the longitudinal direction and forward wave interaction in the circumferential direction. Consequently, this structure may be used as a backward wave amplifier or as a backward wave oscillator. In the case of the backward wave amplifier, the input is coupled to the transmission line of the tube through an energy transfer coupling corresponding in position to the coupling 78 adjacent to the collecting electrode 66 in the tube of FIGURE 3 and the output is taken from the line through an energy transfer coupling corresponding in position to the coupling 76 adjacent to the cathode 46 in the tube of FIGURE 3. If the tube is used as a backward wave oscillator, then, as in the tube of FIGURE 4B, the energy transfer coupling of the tube adjacent to the collecting electrode is terminated in a matched load to prevent reflection of waves from the collecting electrode end of the tube, and the beam current must be larger than the starting current.

While the tubes of FIGURES 3 to 7 have each been described with respect to a transmission line in which the line is positioned around a center conductor, it will be realized that the transmission line may be disposed within a hollow cylindrical conductor and with a beam of spiraling electrons traveling between the transmission line and the conductor. This inverted structure requires that the angular velocity component of the electrons be directed such that the centrifugal force on an electron due to its angular velocity component and the force on an electron due to its velocity component transverse to the magnetic field are both directed radially outward, opposite to the electric field force. Stable orbits may be attained if the direction is reversed but then the tube will not operate.

In the tubes described herein, some of the potential energy of the electron beam derived from the transverse direct current electric field is given up by the electrons as amplification of the space harmonic wave. This is to be distinguished from the usual linear traveling wave tube where the energy used for amplification is the axial kinetic energy of the electrons which are slowed down as they give up energy. The transverse direct-current electric field in the tubes described herein causes the electrons to move transversely toward the transmission line as they give up potential energy to the radio frequency electric field while retaining their original angular velocity. Since, as has been described above, the dispersion of the structure is such that a change in phase velocity-versus-frequency characteristic of the line in one of the two directions of wave propagation is compensated by an opposite change in phase velocity-versus-frequency characteristic of the line in the other direction, the electrons are in synchronism with a constant phase of a space harmonic of the signal waves for any desired frequency within the normal signal wave frequency range of the tube.

The tube of FIGURE 1, for example, can be operated in the manner of a conventional traveling wave tube by omitting the transverse magnetic field and the transverse direct current electric field. For such operation the conductor 14 is maintained at substantially the same potential as the transmission line 12 and the electrons entering the field-free space between the conductor 14 and the line 12 with an initial velocity will drift along the line 12 toward the collecting electrode 23. If the initial velocity is suitably matched to the phase velocity of the space harmonic in the direction of the electrons, the electrons will be bunched and give up kinetic energy to the signal wave fields. The compensation phenomena described above applies to such operation to permit uniform amplification over a wide band of operating frequencies. A disadvantage of this kind of operation is that the electrons tend to get out of synchronism with the space harmonic as they are slowed down in giving up kinetic energy to the wave. However, this same disadvantage is inherent in conventional linear traveling wave tubes. Preferably, for focusing purposes, a conventional magnetic field may be provided, in the region between the conductor 14 and the line 12, having flux lines parallel to the direction of electron flow.

The tubes of FIGURES 3 to 7 can also be operated in the manner of a conventional traveling wave tube, while realizing the compensation phenomena described, by omitting the radial direct current electric field. In these tubes, for such operation, an axial magnetic field is also used, but the center conductor 58 is maintained at substantially the same potential as the transmission line so that the electrons entering the field-free space between the conductor 58 and the line will, under the influence of the magnetic field, describe spiral paths in the space and drift along the line, in interaction relation with the electric field of the space harmonic wave, toward the collecting electrode.

The bi-periodic wave transmission line described has special utility in the millimeter wave region where the small wave lengths encountered give rise to a need for relatively small size wave transmission lines. As is known, in order to keep the dimensions of a line to a reasonably large size for mechanical reasons, the phase velocity of the line must be relatively high; the phase velocity and the size of a line being proportional at any given frequency. When high transmission line phase velocities are used, high electron beam velocities are needed. But high beam velocities are undesirable. When a bi-periodic transmission line is used, the phase velocity of the line in both of the directions of periodicity can be relatively high while the phase velocity of the fundamental space harmonic "seen" by the beam is relatively low. For example, if the phase velocities in two direction 90° apart are the same, and the angle of the electron beam with respect to the line is 45°, the phase velocity "seen" by the beam is $\sqrt{2}/2$ times the phase velocity of the line in either of the two directions separately. Consequently, a line according to the invention can propagate a fundamental space harmonic with a velocity $\sqrt{2}/2$ times lower than that of waves propagated in either of the two directions of periodicity and the electron beam voltage needed is ½ that needed when either of the two directions of periodicity is used alone.

From the foregoing it is seen that the tube of the invention makes use of a dispersive wave propagating structure for achieving good coupling with an electron beam of the tube and at the same time is capable of uniformly amplifying relatively high frequency signal waves over a frequency range which is wider than that of previous traveling wave magnetron amplifier tubes. The bi-periodic transmission line structure of the invention also lends itself for use in tubes operated as a high power, high efficiency oscillators. Furthermore, while the tube of the invention is useful for the amplification of amplitude modulated waves, it will be realized that the tube is also advantageous for the amplification of phase or frequency modulated signal-waves over a wide frequency range.

What is claimed is:

1. A traveling wave tube including a bi-periodic signal wave propagating structure comprising means for propagating waves along two dispersive paths with the waves along one path having phase and group velocities in the same direction, and the waves along the other path having phase and group velocities in opposite directions, to establish a large number of space harmonics of said waves having phase velocities along said structure at various acute angles to said paths; and means for projecting a beam of electrons in wave interaction relation with said structure and with substantially the same electron velocity as the phase velocity of a selected one of said space harmonics whereby at substantially all points in its path each electron will be subjected to a substantially constant phase electric field produced by said selected space harmonic.

2. A traveling wave tube comprising a bi-periodic signal wave propagating structure comprising means for propagating signal waves along longitudinal and transverse dispersive paths with predetermined longitudinal and transverse phase velocities, respectively and with the waves along one of said paths having phase and group velocities in the same direction and the waves along the other of said paths having phase and group velocities in opposite directions, to establish a large number of space harmonics of said waves having phase velocities along said structure at various acute angles to said paths; and means for projecting a beam of electrons along said structure in wave interaction relation therewith and with an electron velocity substantially the same as the phase velocity of a selected one of said space harmonics, whereby, at substantially all points in its path each electron is subjected to a substantially constant phase electric field produced by said selected space harmonic and whereby the wave propagation characteristics of said structure are such that a change in space harmonic phase velocity due to a change in the phase velocity of waves along said structure in one of said paths with a given change in signal-wave frequency is at least partially compensated by an opposite change in space harmonic phase velocity due to a change in the phase velocity of waves in the other of said paths with the same change in signal frequency.

3. A traveling wave tube according to claim 2, wherein the angle of said selected space harmonic is such that the phase velocity of said space harmonic is substantially constant over the normal signal frequency range of the tube.

4. A traveling wave magnetron tube comprising an elongated bi-periodic signal wave propagating structure comprising means for propagating signal waves along longitudinal and transverse dispersive paths with predetermined longitudinal and transverse phase velocities, respectively, and with the waves along one of said paths having phase and group velocities in the same direction and the waves along the other of said paths having phase and group velocities in opposite directions, to establish a large number of space harmonics of said waves having phase velocities along said structure at various acute angles to said paths; an elongated conductor mounted adjacent to said structure and defining with said structure a space therebetween, and being adapted to be biased negatively with respect to said structure to establish a direct current electric field in said space; and means for projecting a beam of electrons along said structure in wave interaction relation therewith and in said space and with an electron velocity substantially the same as the phase velocity of a selected one of said space harmonics, whereby at substantially all points in its path each electron is subjected to a substantially constant phase electric field produced by said selected space harmonic and whereby the wave propagation characteristics of said structure are such that a change in space harmonic phase velocity due to a change in the phase velocity of waves along said structure in one of said paths with a given change in signal-wave frequency is at least partially compensated by an opposite change in space harmonic phase velocity due to a change in the phase velocity of waves in the other of said paths with the same change in signal-frequency.

5. A traveling wave magnetron tube comprising an elongated bi-periodic hollow signal wave propagating structure comprising means for propagating signal waves along axial and transverse dispersive paths with predetermined axial and transverse phase velocities, respectively, and with the waves along one of said paths having phase and group velocities in the same direction and the waves along the other of said paths having phase and group velocities in opposite directions, to establish a large number of space harmonics of said waves having phase velocities along said structure at various acute angles to said paths; an elongated conductor mounted concentric with said structure and defining with said structure an annular space therebetween, and being adapted to be biased negatively with respect to said structure to establish a radial direct current electric field in said space, and means for projecting a hollow beam of electrons in a spiral path along said structure in wave interaction relation therewith and in said space and with an electron velocity substantially the same as the phase velocity of a selected one of said space harmonics, whereby at substantially all points in its path each electron is subjected to a substantially constant phase electric field produced by said selected space harmonic, and whereby the wave propagation characteristics of said structure are such that a change in space harmonic phase velocity due to a change in the phase velocity of waves along said structure in one of said paths with a given change in signal-wave frequency is at least partially compensated by an opposite change in space harmonic phase velocity due to a change in the phase velocity of waves in the other of said paths with the same change in signal frequency.

6. A magnetron tube according to claim 5, wherein said beam projecting means includes means for establishing a time-constant magnetic field parallel to the axis of the tube.

7. A tube according to claim 5, wherein said structure comprises an array of axially-spaced, digitate conductors interdigitated with each other axially of said tube.

8. A tube according to claim 5, wherein said structure comprises an array of longitudinally extending, circumferentially spaced, parallel, digitate conductors interdigitated with each other circumferentially of said tube.

9. A traveling wave tube comprising an elongated bi-periodic signal wave propagating structure comprising means for propagating signal waves along longitudinal and transverse dispersive paths with predetermined longitudinal and transverse phase velocities, respectively, and with the waves along one of said paths having phase and group velocities in the same direction and the waves along the other of said paths having phase and group velocities in opposite directions, to establish a large number of space harmonics of said waves having phase velocities along said structure at various acute angles to said paths; and means for projecting a beam of electrons in wave interaction therewith and with an electron velocity substantially the same as the phase velocity of a selected one of said space harmonics, whereby at substantially all points in its path each electron is subjected to a substantially constant phase electric field produced by said selected space harmonic, the wave propagation characteristics of said structure being such that the sum of the quotient of the longitudinal velocity component of said electrons over said longitudinal phase velocity plus the quotient of the transverse velocity component of said electrons over said transverse phase velocity is substantially unity over the normal signal frequency range of said tube.

10. A tube according to claim 9, wherein said structure comprises an array of spaced, digitate conductors interdigitated with each other.

11. A traveling wave magnetron tube according to claim 9, further comprising an elongated conductor mounted adjacent to said structure and defining with said structure a space therebetween and being adapted to be biased negatively with respect to said structure to establish a direct current electric field in said space, said beam of electrons being projected in said space.

12. A traveling wave tube comprising an elongated bi-periodic signal wave propagating structure comprising means for propagating signal waves along two dispersive paths with the waves along one path having phase and group velocities in the same direction, and the waves along the other path having phase and group velocities in the opposite direction, to establish a large number of space harmonics of said waves along said structure at various acute angles to said paths, said wave propagating means including an array of spaced, digitate conductors with adjacent conductors interdigitated with each other, and means for projecting electrons along said structure in wave interaction therewith and with an electron velocity substantially the same as the phase velocity of a selected one of said space harmonics, whereby at substantially all points in its path each electron is subjected to a substantially constant-phase electric field produced by said selected space harmonic.

13. A traveling wave tube comprising an elongated bi-periodic, hollow, cylindrical signal wave propagating structure comprising means for propagating signal waves along axial and circumferential dispersive paths with the waves along the axial path having phase and group velocities in the same direction and the waves along the circumferential path having phase and group velocities in opposite directions, to establish a large number of space harmonics of said waves along said structure at various acute angles to said paths, said wave propagating means including an array of axially spaced digitate, annular conductors concentric with the axis of said tube and with adjacent conductors interdigitated with each other, and means for projecting electrons in spiral paths along said structure in wave interaction therewith and with an electron velocity substantially the same as the phase velocity of a selected one of said space harmonics along a path, whereby at substantially all points in said paths each electron is subjected to a substantially constant-phase electric field produced by said selected space harmonic.

14. A traveling wave magnetron tube comprising an elongated, bi-periodic, hollow, signal wave propagating structure comprising means for propagating signal waves along axial and circumferential dispersive paths with the waves along the axial path having phase and group velocities in the same direction and the waves along the circumferential path having phase and group velocities in opposite directions, to establish a large number of space harmonics of said waves along said structure at various acute angles to said paths, said wave propagating means including an array of axially-spaced, parallel, digitate, annular conductors concentric with the axis of said tube and with adjacent conductors interdigitated with each other, an elongated conductor mounted coaxially within said structure, defining with said structure an annular space, and adapted to be biased negatively with respect to said structure to establish a radial direct current electric field in said space, and means for projecting electrons in spiral paths along said structure in wave interaction therewith and in said space and with an electron velocity substantially the same as the phase velocity of a selected one of said space harmonics, whereby at substantially all points in said paths each electron is subjected to substantially constant-phase electric field produced by said selected space harmonic.

References Cited in the file of this patent

UNITED STATES PATENTS

| | | |
|---|---|---|
| 2,542,797 | Cuccia | Feb. 20, 1951 |
| 2,683,238 | Millman | July 6, 1954 |
| 2,687,777 | Warnecke | Aug. 31, 1954 |
| 2,694,159 | Pierce | Nov. 9, 1954 |
| 2,704,829 | Clay | Mar. 22, 1955 |
| 2,752,523 | Goodall | June 26, 1956 |
| 2,770,781 | Harvie | Nov. 13, 1956 |
| 2,774,005 | Kazan | Dec. 11, 1956 |
| 2,810,854 | Cutler | Oct. 22, 1957 |
| 2,812,467 | Kompfner | Nov. 5, 1957 |
| 2,849,643 | Mourier | Aug. 26, 1958 |
| 2,858,472 | Karp | Oct. 28, 1958 |
| 2,888,598 | Palluel | May 26, 1959 |

FOREIGN PATENTS

| | | |
|---|---|---|
| 691,900 | Great Britain | May 20, 1953 |